March 24, 1959  F. R. MAYO  2,879,276
OXIDE FORMATION
Filed May 31, 1956
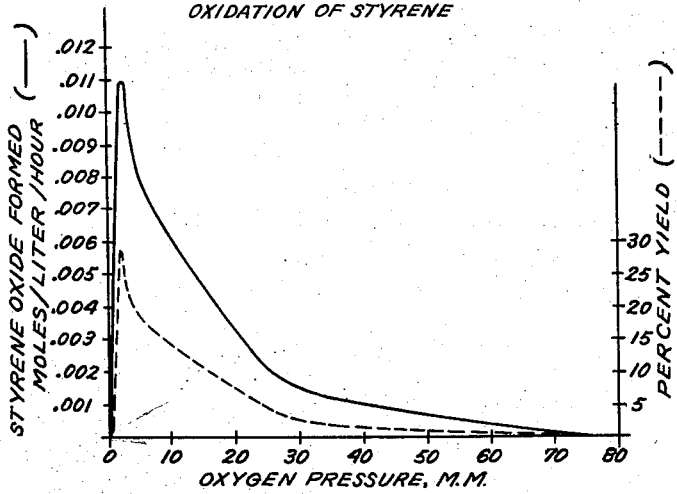
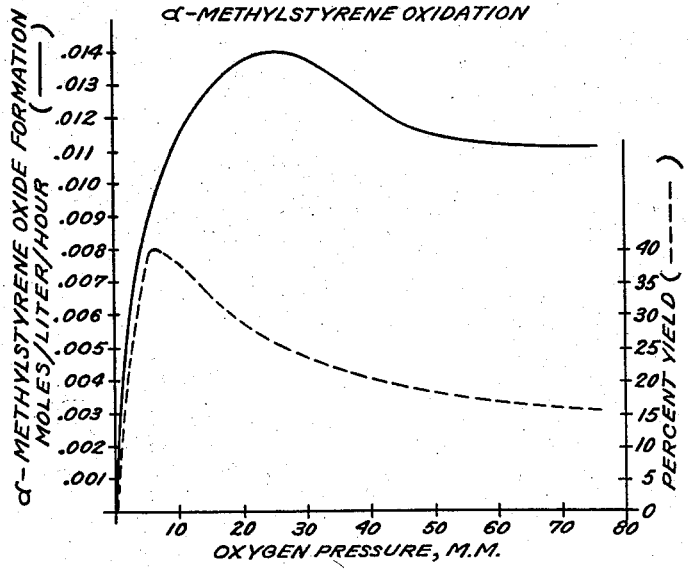
Inventor:
Frank R. Mayo,
by Paul G. Frank
His Attorney.

2,879,276
Patented Mar. 24, 1959

2,879,276
OXIDE FORMATION

Frank R. Mayo, Schenectady, N.Y., assignor to General Electric Company, a corporation of New York Application May 31, 1956, Serial No. 588,343
8 Claims. (Cl. 260—348.5)

This invention relates to the preparation of olefin oxides. More particularly, this invention relates to the preparation of olefin oxides which comprises effecting reaction between oxygen and a hydrocarbon containing a pair of conjugated carbon-carbon double bonds, at least one of which is olefinic.

In the past, oxides have been prepared from a number of olefins in either the vapor phase or the liquid phase. Thus, ethylene oxide is often prepared by effecting reaction between ethylene and oxygen in the vapor phase. Likewise, olefins such as α-diisobutylene and other higher mono-olefins have been converted to oxides by effecting reaction between the olefin in the liquid phase and oxygen. In the case of these liquid-phase oxidations, the oxidation reaction has generally been carried out at a pressure near atmospheric up to high superatmospheric pressures.

However, when an attempt is made to prepare an olefin oxide from a hydrocarbon containing at least one pair of conjugated carbon-carbon double bonds where one of the double bonds is an olefinic double bond, at atmospheric pressure or above, only a minute amount of the olefin oxide is formed in comparison to the amount of other products formed. Thus, where an attempt is made to prepare an olefin oxide from α-methylstyrene, with oxygen at one atmosphere and at a temperature of about 50° C., only about 2 percent of the reaction product is the α-methylstyrene oxide while the remainder of the product is α-methylstyrene polyperoxide, acetophenone, and formaldehyde. Similarly, when an attempt is made to form styrene oxide under the same conditions, the resulting products consist almost entirely of styrene peroxide, benzaldehyde and formaldehyde with no detectable amount of styrene oxide present. When an attempt is made to form an oxide from an aliphatic diene such as 2,3-dimethylbutadiene, the reaction products again consist of peroxides, ketones, and aldehydes with practically no oxide being formed.

Unexpectedly, I have discovered that oxygen pressure is critical when oxidizing hydrocarbons of the type described to olefin oxides. Specifically, I have discovered that excellent yields of olefin oxides are obtained from the liquid phase reaction at a temperature of from 0–120° C. between (1) oxygen at a pressure of from 0.1 to 40 mm. and (2) a hydrocarbon of the class described.

My invention may be best understood from the following description taken in conjunction with the drawings in which Fig. 1 illustrates the effect of oxygen pressure on the oxidation of styrene and Fig. 2 illustrates the effect of oxygen pressure on the oxidation of α-methylstyrene.

The term "olefin oxide" as used in the present invention is intended to refer to olefinic compounds in which one atom of oxygen is added across an olefinic double bond. These olefin oxides, which are also commonly known as epoxides, contain the following oxide or epoxide group.

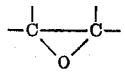

The process of my invention is applicable to all hydrocarbon compounds containing conjugated carbon-carbon double bonds with at least one of the conjugated double bonds being an olefinic double bond. For convenience these compounds will be referred to as "conjugated olefins." By carbon-carbon double bonds is meant double bonds between two carbon atoms. The term "conjugated carbon-carbon double bonds" includes compounds having the structure

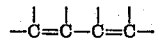

in which one of the carbon-carbon double bonds is olefinic and the other is aromatic as well as compounds in which both of the conjugated double bonds are olefinic. Thus, conjugated olefins employed in the practice of the present invention include aromatic-substituted olefins such as, for example, compounds having the formula:

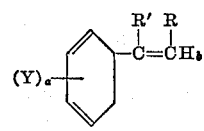

where R and R' are members selected from the class consisting of hydrogen and alkyl radicals, e.g. methyl, ethyl, propyl, butyl, etc. radicals; Y is an alkyl radical; $a$ is a whole number equal to from 0 to 2; and $b$ is an niteger equal to from 1 to 3, inclusive. Suitable aromatic substituted olefins include, for example, styrene, α-methylstyrene, β-methylstyrene, α-ethylstyrene, divinylbenzene, p-methylvinyl benzene, vinyl naphthalene, etc. Aliphatic hydrocarbon compounds within the scope of the invention include, for example, 1,3-pentadiene, 2-methyl-1,3-butadiene, 2,3-dimethyl-1,3-butadiene, etc. A compound such as 2,3-pentadiene or allylbenzene is not within the scope of the present invention since the hydrocarbon does not contain conjugated double bonds. Similarly, a compound such as acrylic acid is not within the scope of the present invention since the compound does not contain conjugated carbon-carbon double bonds even though the acid does have conjugated double bonds, one of the double bonds being in the carbonyl group.

As previously mentioned, the oxygen pressure employed in forming the oxides is critical and the broad pressure range is from about 0.1 mm. of oxygen up to about 40 mm. The oxygen pressures thus described refer to the partial pressure of oxygen in the reaction mixture and it should be noted that the oxygen partial pressure will not be the same as the total pressure in the reaction mixture since the conjugated olefin will exert its own partial pressure. The preferred oxygen pressure of my invention depends on the particular conjugated olefin being oxidized. However, in the case of all conjugated olefins within the class described, it is obvious that no epoxide will be formed at zero oxygen pressure. However, as the oxygen pressure increases from zero, the relative proportion of oxides in the reaction product increases and also the rate of oxide formation increases. Both of these increases occur until a maximum is reached, at which point the rate of oxide formation begins to decrease. The rate at which the rate of oxide formation decreases varies with the particular olefin being oxidized. As an illustration of the preferred oxygen partial pressure for several different olefins, the preferred pressure with styrene is about 2.9 mm. while the preferred oxygen pressure for the oxidation of α-methylstyrene is about 6 mm. when the oxidations are carried out at about 50° C.

It should be understood that in the oxidations within the scope of the present invention, the oxide is not the sole reaction product but the reaction products include also those materials which are observed in prior art oxidations. Thus, in the oxidation of styrene, the products include a polymeric styrene peroxide as well as benzaldehyde and formaldehyde. In the oxidation of α-methylstyrene, the reaction products include, in addition to the α-methylstyrene oxide, α-methylstyrene peroxide, α-methylstyrene peroxide polymers and acetophenone and formaldehyde.

In addition to depending on the oxygen partial pressure, the rate of reaction of oxide formation in the present invention depends also on the temperature at which the reaction is conducted. Thus, it has been found that the rate of reaction increases with increasing temperature. However, at temperatures above about 120° C. the relative yield of the oxide begins to decrease because of polymerization of the starting olefin at that temperature. Another disadvantage of employing temperatures above 120° C. is that many of the olefin oxides themselves will begin polymerizing at this temperature. Therefore, the preferred upper temperature limit is about 120° C. I prefer not to employ reaction temperatures below about 0° C. since at temperatures below 0° C. the rate of reaction becomes excessively slow.

The rate of olefin oxide formation is also affected by the use of catalysts in the reaction of the present invention. Although olefin oxides are obtained both with and without catalysts, the rate of reaction is much higher in the presence of catalysts. The catalysts employed for the reaction are those catalysts commonly referred to as the free radical catalysts or free radical initiators. Since the reaction of the present invention is a liquid-phase reaction, it is convenient to designate the amount of catalyst present as a function of the volume of the conjugated olefin. Satisfactory catalysis of the reaction mixture has been obtained employing from 0.001 molar to 1.0 molar, and preferably about 0.1 molar solutions of the catalyst in the olefin. Among the free radical catalysts which may be employed in the practice of the present invention are included, for example, azodiisobutyronitrile, benzoyl peroxide, bis-(2,4-dichlorobenzoyl)-peroxide, lauroyl peroxide, bis-(p-chlorobenzoyl)-peroxide, acetyl benzoyl peroxide, hydroxyheptyl peroxide, isopropyl percarbonate, methyl ethyl ketone peroxide, cyclohexanone peroxide, cyclohexyl hydroperoxide, cumene hydroperoxide, di-α-cumyl peroxide, t-butyl hydroperoxide, methyl amyl ketone peroxide, acetyl peroxide, methylcyclohexyl hydroperoxide, t-butyl permaleic acid, t-butyl perbenzoate, di-t-butyl diperphthalate, t-butyl perphthalic acid, p-chlorobenzoyl peroxide, t-butyl peracetate, di-t-butyl peroxide, dibenzal diperoxide, potassium persulfate, etc.

In carrying out the process of my invention, the conjugated olefin and initiator are added to a suitable reaction vesesl. The liquid is stirred vigorously while the vessel is maintained at the desired reaction temperature and while oxygen or air is introduced at a measured steady rate. Gases are removed through a cooled condenser, to return most of the conjugated olefin to the reaction vessel, and the pressure in the reaction vessel is held constant by a manostat between the vessel and a vacuum pump. When pure oxygen is introduced, the pressure of oxygen in the vessel is equal to the absolute pressure in the vessel minus the vapor pressure of the reaction mixture at the reaction temperature. When air is introduced, the pressure of oxygen in the reaction vessel is equal to the mole fraction of oxygen in the exhaust gases (after any monomer has been removed by strong cooling) times the difference between the absolute pressure in the reaction vessel and the vapor pressure of the reaction mixture. In either case, oxygen is supplied at a rate of at least equal to, and preferably 1.5–10 times greater than, the rate of reaction of oxygen at the chosen pressure and initiator concentration.

To determine the efficiency of my reaction, the amount of unreacted styrene and the amount of olefin oxide are determined. The weight of the conjugated olefin remaining at the end of the reaction in the condensate traps and in the reaction mixture is determined and this weight is subtracted from the original weight of conjugated olefin to determine the amount of conjugated olefin which had reacted during the course of the reaction. The amount of oxide formed during the reaction is determined by fractionally distilling the reaction mixture at reduced temperatures and pressures. The distillate, which contains all of the olefin oxide, is then analyzed by infrared analysis, comparing the infrared results with known standards.

The following examples are illustrative of the practice of my invention and are not intended for purposes of limitation.

*Example 1*

This example illustrates the oxidation of styrene to styrene oxide (phenylethylene oxide) at various pressures. A 0.01 molar solution of azodiisobutyronitrile in styrene was made up. Following the procedure outlined previously, this solution was added to a reaction flask and the reaction mixture was maintained at a specific oxygen pressure. The reaction mixture was maintained at 50° C. with stirring for 6–8 hours. At this time, a determination was made of the amount of styrene oxide formed during the reaction and of the styrene which was used up during the course of the reaction. Among the reaction products, in addition to the styrene oxide, were benzaldehyde, formaldehyde, and styrene peroxide. The table below lists the oxygen pressures maintained in the system, the moles per liter per hour of styrene oxide formed, the moles per liter per hour of styrene consumed, and the per cent yield of styrene oxide based on styrene reacted. In those runs in which the pressure was below 4 mm., the oxygen was supplied as air while in the runs at higher pressures the oxygen was supplied in pure form.

| Oxygen Pressure, mm. | Styrene Oxide Formed, Moles/l./hr. | Styrene Reacted, Moles/l./hr. | Percent Yield of Styrene Oxide |
|---|---|---|---|
| 0.19 | 0.0004 | .0681 | .06 |
| 0.44 | 0.0090 | .0351 | 25.7 |
| 0.74 | 0.0082 | .0309 | 26.2 |
| 0.75 | 0.0084 | .0298 | 28.2 |
| 1.74 | 0.0093 | .0394 | 23.6 |
| 2.9 | 0.0111 | .0452 | 24.5 |
| 4.7 | 0.0077 | .0485 | 15.9 |
| 11.7 | 0.0060 | .0542 | 13.3 |
| 13.5 | 0.0067 | .0534 | 12.5 |
| 26.0 | 0.0019 | .0543 | 3.5 |
| 75.5 | 0.0001 | .0591 | .002 |
| 75 | 0.0003 | .0546 | .003 |

Data from this table are plotted in Fig. 1 of the accompanying drawing which shows both the moles per liter per hour of styrene oxide formed and the yield of styrene oxide as a function of oxygen pressure in the reaction system. As is seen from an examination of Fig. 1, the rate of formation of styrene oxide starts out at a zero rate at zero oxygen pressure and then goes through a maximum and falls off to substantially zero by the time the oxygen pressure has increased to about 75 mm. Similarly, the yield of styrene oxide is zero at zero oxygen pressure and passes through a maximum of from 25–30 yield and again drops off the zero at an oxygen pressure of about 75 mm.

*Example 2*

This example illustrates the conversion of α-methylstyrene to α-methylstyrene oxide by the process of the present invention. The procedure followed in this example is identical to that followed in Example 1 except that α-methylstyrene was substituted for styrene. Thus, the temperature at which the reaction was carried out was 50° C. and the α-methylstyrene contained 0.01 mole of azodiisobutyronitrile per liter of α-methylstyrene. The table below lists the oxygen pressures employed, the reaction time, the moles per liter per hour of α-methylstyrene oxide formed, the moles per liter per hour of α-methylstyrene reacted, and the yield of α-methylstyrene.

| Oxygen Pressure, mm. | Reaction Time, Hours | α-Methyl-styrene Oxide Formed, Moles/l./hr. | α-Methyl-styrene Reacted, Moles/l./hr. | Percent Yield of α-Methyl-styrene Oxide |
|---|---|---|---|---|
| 5.9 | 6.5 | 0.0096 | 0.0241 | 39.8 |
| 15.0 | 7.0 | 0.0131 | 0.0385 | 34.0 |
| 24.5 | 6.0 | 0.0137 | 0.0520 | 26.4 |
| 24.6 | 6.0 | 0.0120 | 0.0487 | 24.6 |
| 25.1 | 6.0 | 0.0134 | 0.0498 | 26.9 |
| 25.3 | 7.0 | 0.0141 | 0.0518 | 27.1 |
| 49.7 | 6.1 | 0.0115 | 0.0665 | 17.3 |
| 75.1 | 7.0 | 0.0112 | 0.0720 | 15.5 |
| 101.0 | 6.0 | 0.0092 | 0.0761 | 12.2 |

Data from the above table are plotted in Fig. 2 which shows both the moles per liter per hour of α-methylstyrene oxide formed and the yield as a function of oxygen pressure. From this figure it is seen that the rate of formation of the α-methylstyrene oxide is zero at zero oxygen pressure and increases through a maximum at a pressure of around 25 mm. of mercury and then begins to fall off as the oxygen pressure increases. Similarly, the yield of α-methylstyrene oxide is zero at zero oxygen pressure, rises through a maximum at around 6 mm. of oxygen pressure and then begins to fall off as the oxygen pressure increases.

*Example 3*

The following example illustrates both the use of temperatures other than the 50° C. temperature described in the previous examples and the use of a different technique for maintaining a low oxygen pressure. Here the total pressure in the flask was one atmosphere. One hundred ml. per minute of air was introduced for six hours into a flask containing 1 liter of well-stirred α-methylstyrene at 60°, containing 0.01 mole azodiisobutyronitrile, and fitted with a reflux condenser. The oxygen found in the products was approximately equal to that supplied. Hence, under the conditions specified, substantially all the oxygen was removed from the air stream by the reaction mixture and the oxygen pressure was below 20 mm. During this run 0.0415 mole per liter per hour of α-methylstyrene oxide were formed while 0.0855 mole per liter per hour of α-methylstyrene were reacted. This amounted to a yield of 48.5 percent. When this procedure was repeated at a temperature of 70° C., 0.0435 mole per liter per hour of α-methylstyrene oxide were formed and 0.0875 mole per liter per hour of α-methylstyrene were reacted. This represented a yield of approximately 50 percent.

*Example 4*

This example illustrates the process of the present invention employing higher catalyst concentrations than described in the previous examples. The procedure of Example 2 was repeated except that the α-methylstyrene contained 0.04 mole of azodiisobutyronitrile per liter of solution. When this solution was oxidized for 7 hours under an oxygen pressure of 25.0 mm., 0.0394 mole per liter per hour of α-methylstyrene oxide were formed with 0.1194 mole per liter per hour of α-methylstyrene being used up. This amounted to a yield of about 33 per cent.

Although the above examples have described the oxidation of only two of the conjugated olefins within the scope of the present invention, it should be understood that my process is applicable to other conjugated olefins of the type described. Thus, my process is applicable to all hydrocarbons containing at least one pair of conjugated carbon-carbon double bonds where one of the pair of double bonds is an olefinic double bond. It should also be understood that my process is applicable at temperatures other than those specifically described in the examples, i.e. temperatures of from about 0 to 120° C. My process is also applicable to oxidations of the conjugated olefins described in the absence of any type of free radical initiator as well as in the presence of free radical initiators other than the specific material described in the examples.

The olefin oxides prepared by the process of the present invention are valuable in the preparation of polymeric materials. Thus, these olefin oxides may be condensed with dihydric phenols such as p-p'-dihydroxydiphenyl oxide to form polymeric materials valuable for use in molding compositions, coating compositions, and the like. In addition, the olefin oxides may be converted to glycols by hydrogenation and the glycols may be used in the formation of polymeric polyesters by condensation with polybasic acids.

What I claim as new and desire to secure by Letters Patent of the United States is:

1. The process of preparing an olefin oxide which comprises effecting reaction at a temperature of from 0 to 120° C. between (a) oxygen at an oxygen partial pressure of from 0.1 to 40 mm., and (b) a compound in the liquid phase selected from the class consisting of styrene and α-methylstyrene.

2. The process of preparing styrene oxide which comprises effecting reaction between liquid styrene and oxygen at an oxygen partial pressure of from 0.1 to 40 mm. and at a temperature of from 0 to 120° C.

3. The method of preparing α-methylstyrene oxide which comprises effecting reaction between liquid α-methylstyrene and oxygen at an oxygen partial pressure of from 0.1 to 40 mm. and a temperature of from 0 to 120° C.

4. The process of forming an olefin oxide which comprises effecting reaction at a temperature of about 50° C. between (a) oxygen at an oxygen partial pressure of from 0.1 to 40 mm. and (b) a compound in the liquid phase selected from the class consisting of styrene and α-methylstyrene.

5. The process of claim 4 in which the reaction is carried out in the presence of a free radical initiator.

6. The process of claim 5 in which the free radical initiator is azodiisobutyronitrile.

7. The method of preparing styrene oxide which comprises effecting reaction between liquid styrene and oxygen at an oxygen partial pressure of from about 0.44 to 13.5 mm. at a temperature of about 50° C.

8. The method of preparing α-methylstyrene oxide which comprises effecting reaction between liquid α-methylstyrene and oxygen at an oxygen partial pressure of from about 5.9 to 25.3 mm. at a temperature of about 50° C.

References Cited in the file of this patent

UNITED STATES PATENTS

| | | |
|---|---|---|
| 2,052,195 | Schneider et al. | Aug. 25, 1936 |
| 2,197,101 | Eaglesfield | Apr. 16, 1940 |
| 2,381,561 | Standinger | Aug. 7, 1945 |
| 2,741,623 | Millidge | Apr. 10, 1956 |
| 2,767,208 | Miller | Oct. 16, 1956 |

OTHER REFERENCES

Barnes: J.A.C.S. 72: 210–215 (1950).

Abere et al.: J. Appl. Chem., vol. 1, pp. 363–70 (1951).